United States Patent
Shibagaki et al.

(10) Patent No.: US 8,140,916 B2
(45) Date of Patent: Mar. 20, 2012

(54) UNIT FOR PREDICTING MALFUNCTION OF AN APPARATUS

(75) Inventors: Taro Shibagaki, Tokyo (JP); Satoru Nunokawa, Hino (JP); Masaki Kato, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 19 days.

(21) Appl. No.: 12/869,122

(22) Filed: Aug. 26, 2010

(65) Prior Publication Data

US 2011/0113289 A1   May 12, 2011

(30) Foreign Application Priority Data

Nov. 6, 2009 (JP) .................................. 2009-255310
Aug. 9, 2010 (JP) .................................. 2010-179021

(51) Int. Cl.
*G06F 11/00* (2006.01)

(52) U.S. Cl. ........ 714/47.2; 324/522; 324/523; 324/537; 714/37; 714/39; 714/47.1; 714/47.3; 714/48; 714/709

(58) Field of Classification Search .................. 324/522, 324/523, 537; 714/37, 39, 47.1, 47.2, 47.3, 714/48, 709

See application file for complete search history.

(56) References Cited

U.S. PATENT DOCUMENTS

| | | | | |
|---|---|---|---|---|
| 4,456,992 A | * | 6/1984 | Schaub | 714/709 |
| 5,418,453 A | * | 5/1995 | Wise | 324/160 |
| 7,471,092 B2 | * | 12/2008 | Amanuma et al. | 324/522 |
| 7,890,283 B2 | * | 2/2011 | Sadayuki et al. | 702/116 |
| 2010/0201373 A1 | * | 8/2010 | Sato et al. | 324/537 |

FOREIGN PATENT DOCUMENTS

JP   2001-256736   9/2001

* cited by examiner

*Primary Examiner* — Robert Beausoliel, Jr.
*Assistant Examiner* — Joshua P Lottich
(74) *Attorney, Agent, or Firm* — Finnegan, Henderson, Farabow, Garrett & Dunner, L.L.P.

(57) ABSTRACT

According to one embodiment, a malfunction predicting unit includes a level reduction unit, a first buffer gate unit, a second buffer gate unit, a comparator unit and a processing unit. The level reduction unit reduces an input digital signal to generate a level-reduced signal. The first buffer gate unit generates a first output signal. The first output signal has first or second level if the digital signal is or is not higher than a preset threshold level, respectively. The second buffer gate unit generates a second output signal. The second output signal has the first or second level if the level-reduced signal is or is not higher than the preset threshold level, respectively. The comparator unit compares the first and second output signals to generate a comparison result. The processing unit determines whether a malfunction will soon occur, based on the comparison result.

7 Claims, 7 Drawing Sheets

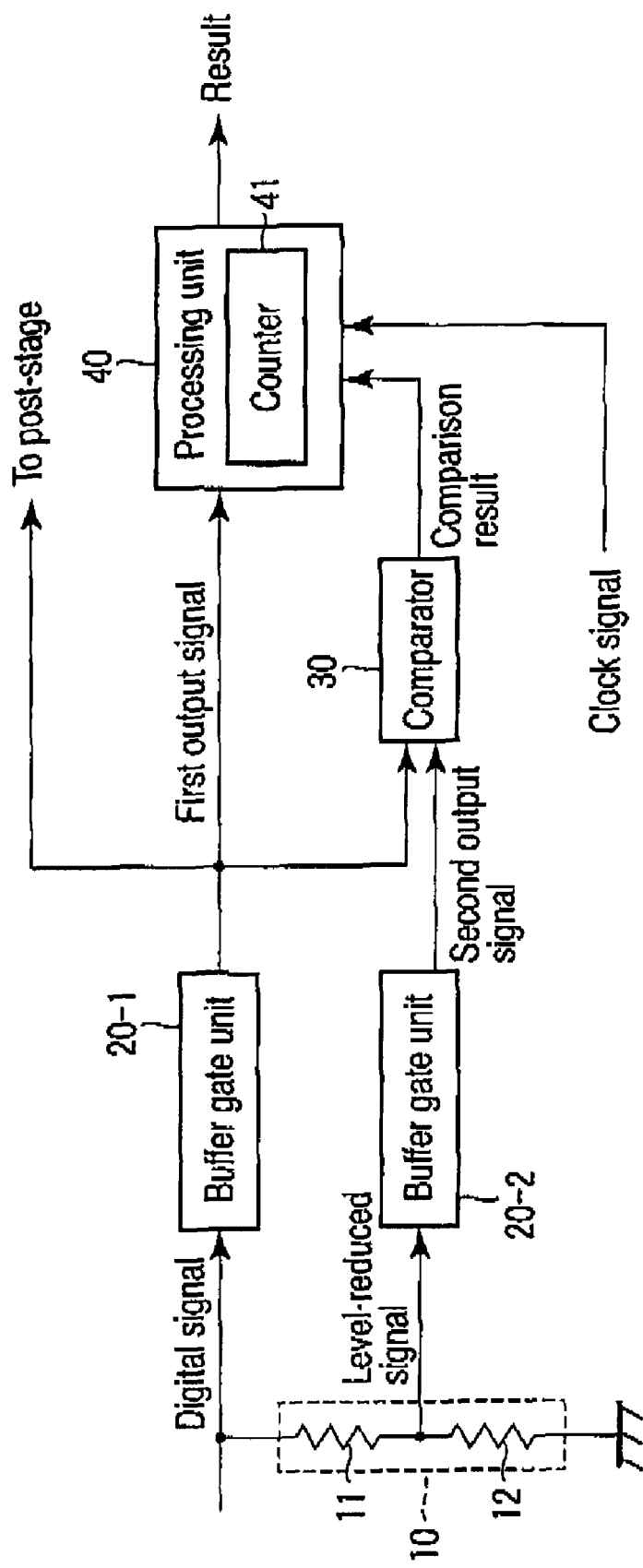
F I G. 1

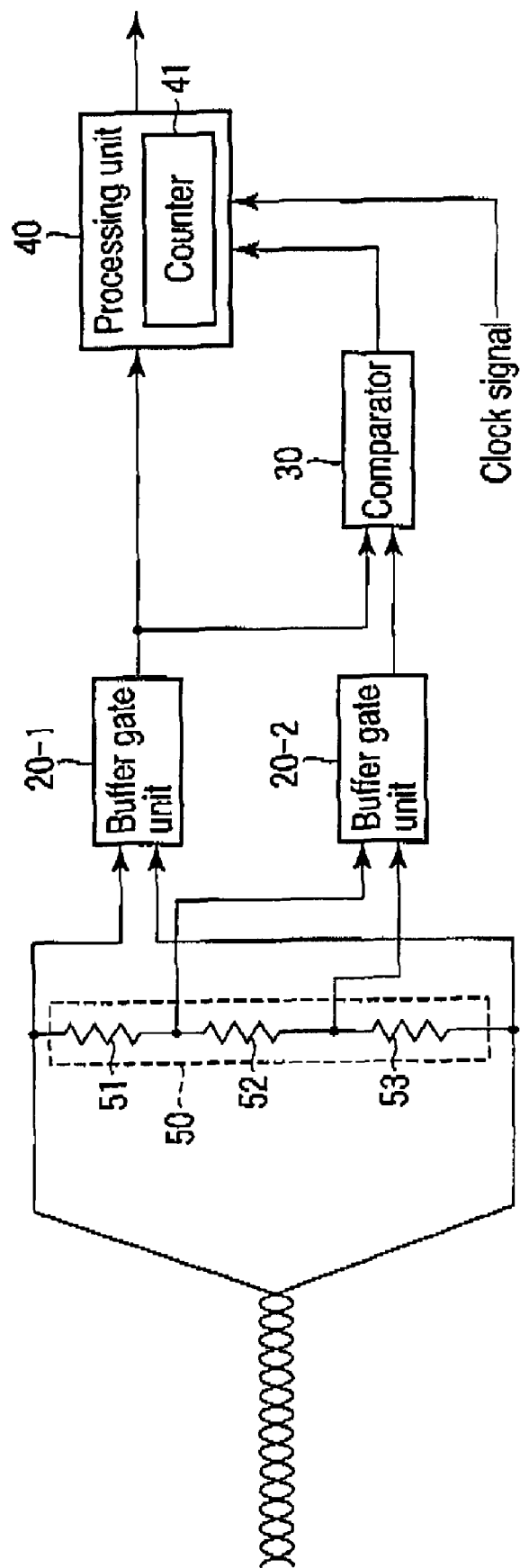
F I G. 6

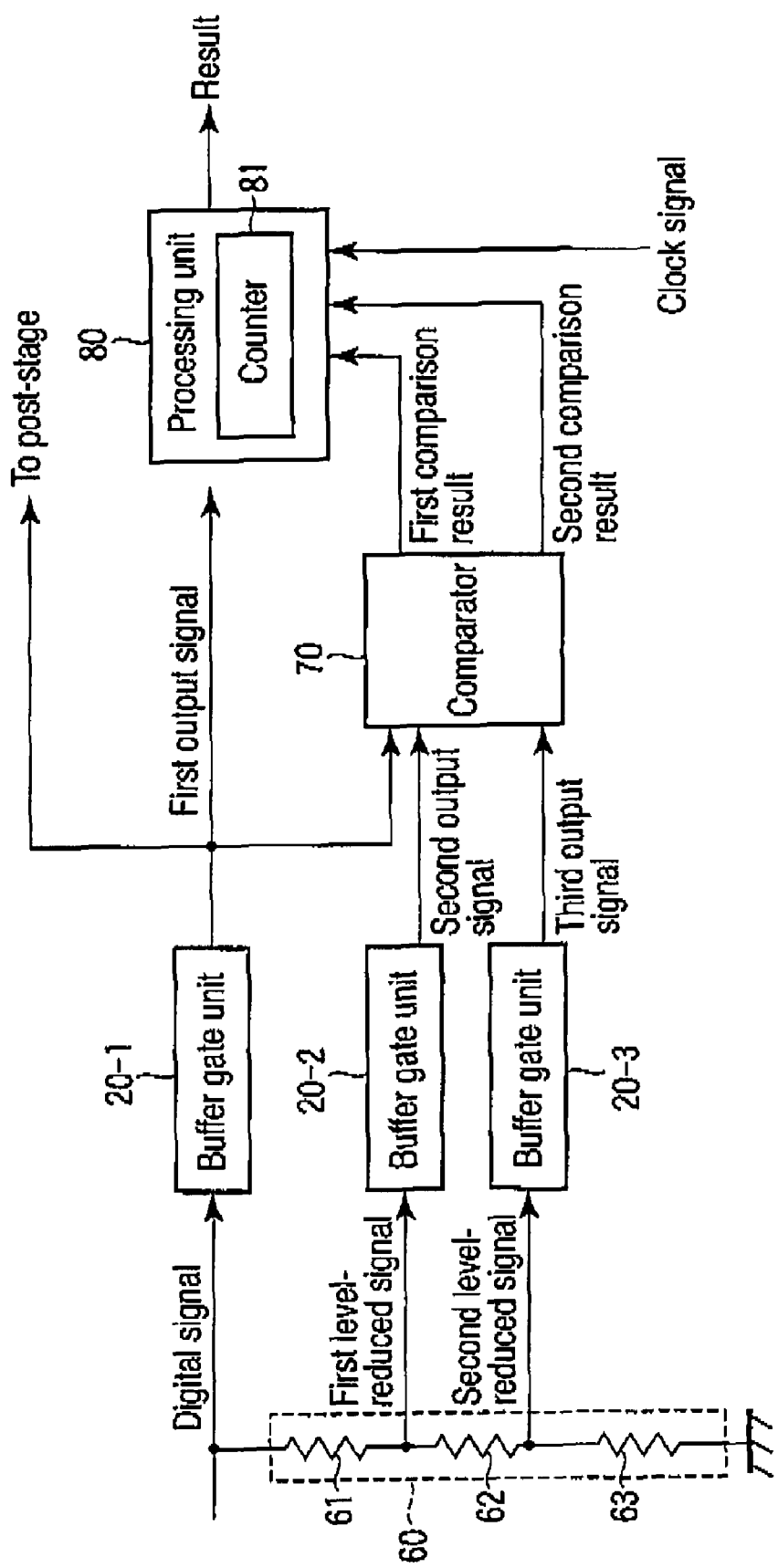
F I G. 7

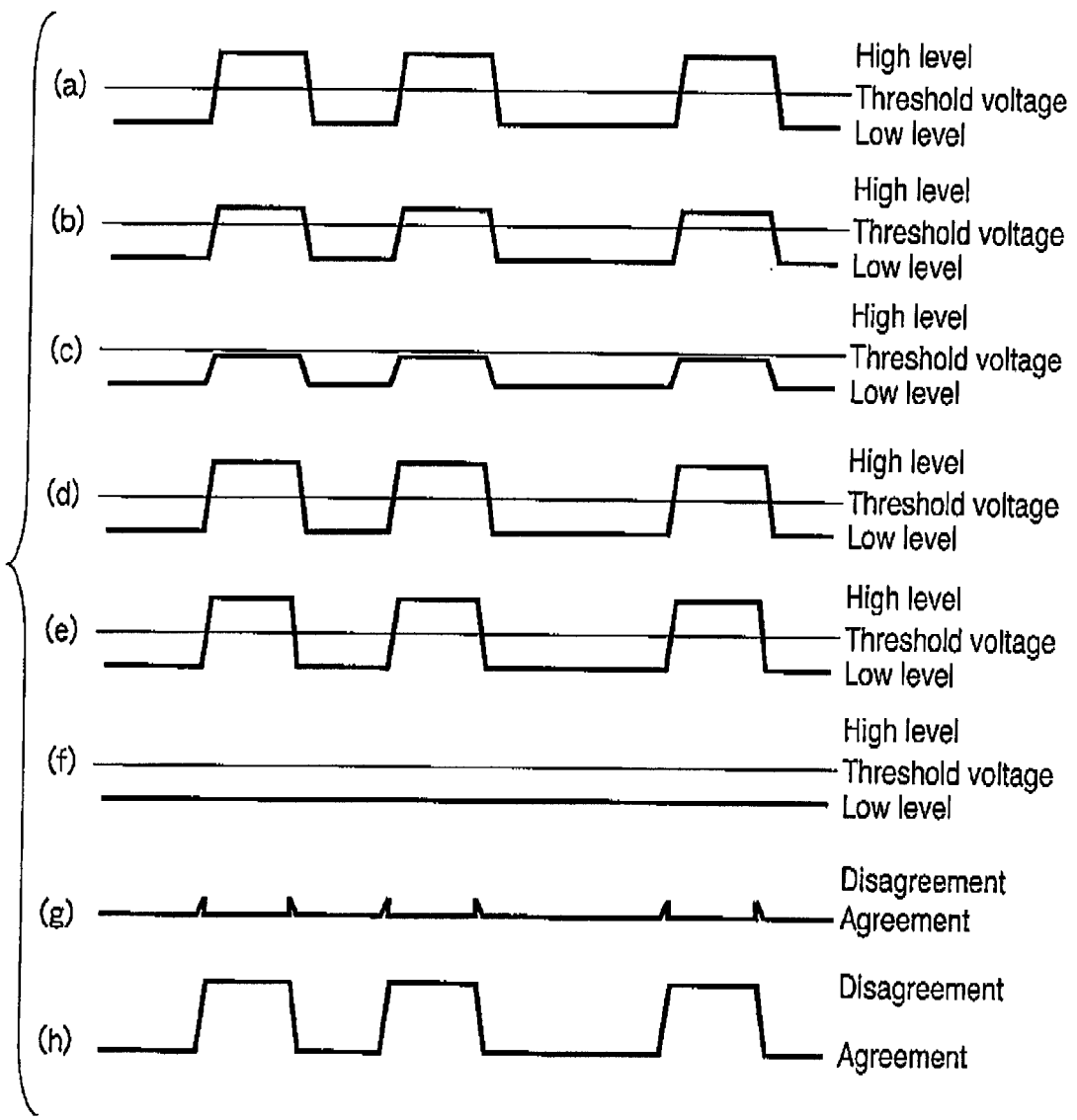
F I G. 8

UNIT FOR PREDICTING MALFUNCTION OF AN APPARATUS

CROSS-REFERENCE TO RELATED APPLICATIONS

This application is based upon and claims the benefit of priority from Japanese Patent Applications No. 2009-255310, filed Nov. 6, 2009; and No. 2010-179021, filed Aug. 9, 2010; the entire contents of both of which are incorporated herein by reference.

FIELD

Embodiments described herein relate generally to a unit for predicting malfunction of an apparatus.

BACKGROUND

A malfunction predicting unit is installed to devices comprised in an apparatus providing, for example, a broadcast transmit system to measure the level of a signal input to each devices, and predict occurrence of a malfunction of the apparatus. The malfunction predicting unit prevents malfunction of each device. Conventional malfunction predicting units each incorporate a detector circuit comprising a diode, a capacitor and a comparator. These malfunction predicting units detect the DC component of the input signal using the detector circuit, and compare the detected signal with preset threshold levels using the comparator. If the levels of the detected signal are lower than the threshold levels, it is determined that a malfunction will soon occur in the apparatus.

Recently, high-speed devices have come to be widely used, and hence high-frequency and small-amplitude input signals have come to be used. Under these circumstances, it is difficult to detect input signals by such a detector circuit as mentioned above. Further, the provision of the malfunction predicting unit in the apparatus may disturb the waveform of the input signal, thereby causing malfunction of the device.

Yet further, the conventional malfunction predicting units incorporate a large number of circuit components, such as a diode, a capacitor, a plurality of comparators, and a reference supply. Accordingly, when a variation in signal level is detected, the possibility that the variation is caused by one of the circuit components of the malfunction predicting unit cannot be denied. In addition, since the conventional malfunction predicting units incorporate a large number of circuit components, their circuit scale and manufacturing cost will be inevitably increased.

Jpn. Pat. Appln. KOKAI Publication No. 2001-256736, for example, has proposed a data reproduction apparatus in which the detection performance is enhanced by adjusting the determination level of the detector.

BRIEF DESCRIPTION OF THE DRAWINGS

FIG. 1 is a block diagram illustrating the configuration of a malfunction predicting unit according to a first embodiment;

FIG. 6 is a block diagram illustrating the configuration of a malfunction predicting unit according to a second embodiment;

FIG. 7 is a block diagram illustrating the configuration of a malfunction predicting unit according to a third embodiment;

FIG. 8 is a view illustrating signals input to the elements of the malfunction predicting unit shown in FIG. 7.

DETAILED DESCRIPTION

Figure 2:
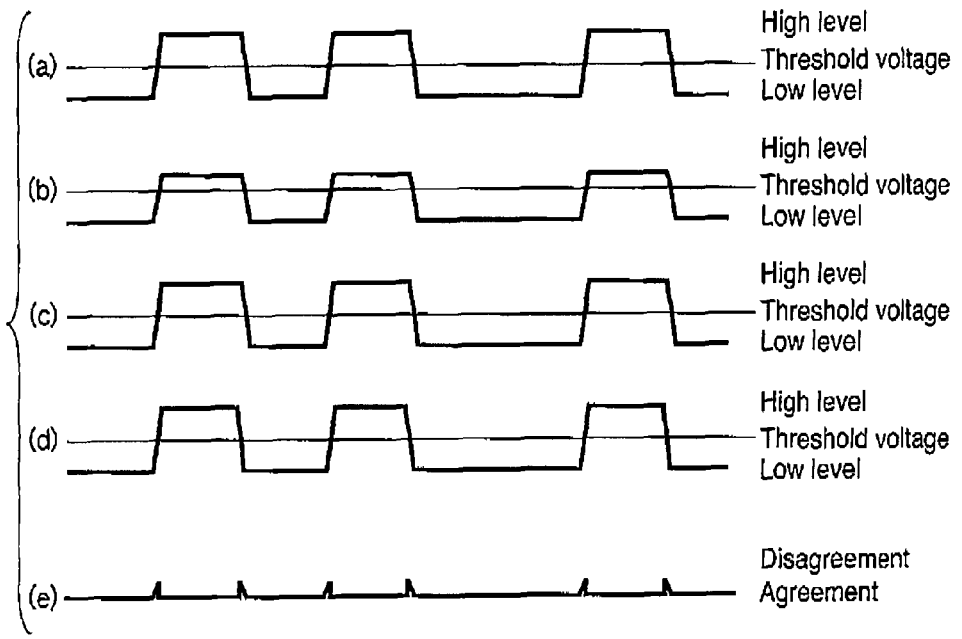
FIG. 2 is a view illustrating signals input to the elements of the malfunction predicting unit shown in FIG. 1.

In general, according to one embodiment, there is provided a malfunction predicting unit including a level reduction unit, a first buffer gate unit, a second buffer gate unit, a comparator unit and a processing unit. The level reduction unit reduces an input digital signal by a preset level to generate a level-reduced signal. The first buffer gate unit generates a first output signal. The first output signal has first or second level if the digital signal is higher than a preset threshold level or is not higher than the preset threshold level, respectively. The second buffer gate unit generates a second output signal. The second output signal has the first or second level if the level-reduced signal is higher than the preset threshold level or is not higher than the preset threshold level, respectively. The comparator unit compares the first and second output signals to generate a comparison result indicating whether the first and second output signals agree with each other. The processing unit determines whether a malfunction will soon occur, based on the comparison result.

First Embodiment

FIG. 1 is a block diagram illustrating the configuration of a malfunction predicting unit according to a first embodiment. The malfunction predicting unit of FIG. 1 comprises a level reduction unit 10, buffer gate units 20-1 and 20-2, a comparator 30, and a processing unit 40. In the first embodiment, the malfunction predicting unit will be described using, as an example, unbalanced connection to a complementary metal-oxide semiconductor (CMOS).

A digital signal input to the malfunction predicting unit is distributed to the buffer gate unit 20-1 and the level reduction unit 10.

The level reduction unit 10 comprises resistors 11 and 12. By the resistors 11 and 12, the digital signal is divided into a ground level signal and a reduced-level signal. The reduced-level signal, which has its level reduced by 20% by the level reduction unit 10, is sent to the other buffer gate unit 20-2.

The buffer gate unit 20-1 receives a digital signal, adjusts the voltage of the received digital signal based on a preset threshold voltage, and outputs a first output signal to the comparator 30, the processing unit 40, and post-stage elements (not shown). For instance, if the voltage of the received digital signal exceeds the preset threshold voltage, the buffer gate unit 20-1 outputs a first output signal that has its voltage adjusted at a preset "high level." In contrast, if the voltage of the received digital signal does not exceed the preset threshold voltage, the buffer gate unit 20-1 outputs a first output signal that has its voltage adjusted at a preset "low level."

The buffer gate unit 20-2 receives a level-reduced signal from the level reduction unit 10, adjusts the voltage of the received level-reduced signal based on the preset threshold voltage, and outputs a second output signal to the comparator 30. For instance, if the voltage of the received level-reduced signal exceeds the preset threshold voltage, the buffer gate unit 20-2 outputs a second output signal that has its voltage adjusted at the preset "high level." In contrast, if the voltage of the received level-reduced signal does not exceed the preset threshold voltage, the buffer gate unit 20-2 outputs a second output signal that has its voltage adjusted at the preset "low level."

The comparator 30 compares the first output signal from the buffer gate unit 20-1 with the second output signal from the buffer gate unit 20-2 by logical comparison (exclusive OR), and outputs the comparison result to the processing unit 40. More specifically, if the first and second output signals agree with each other, the comparator 30 outputs a low signal of a "low level" voltage as the comparison result. Further, if the first and second output signals disagree with each other, the comparator 30 outputs a high signal of a "high level" voltage as the comparison result.

Namely, if both the first and second output signals are of the "high level" voltage, the comparator 30 outputs a low signal indicating that the first and second output signals agree with each other. In contrast, if both the first output signal is of the "high level" voltage and the second output signal is of the "low level" voltage, the comparator 30 outputs a high signal indicating that the first and second output signals disagree with each other.

Figure 3:
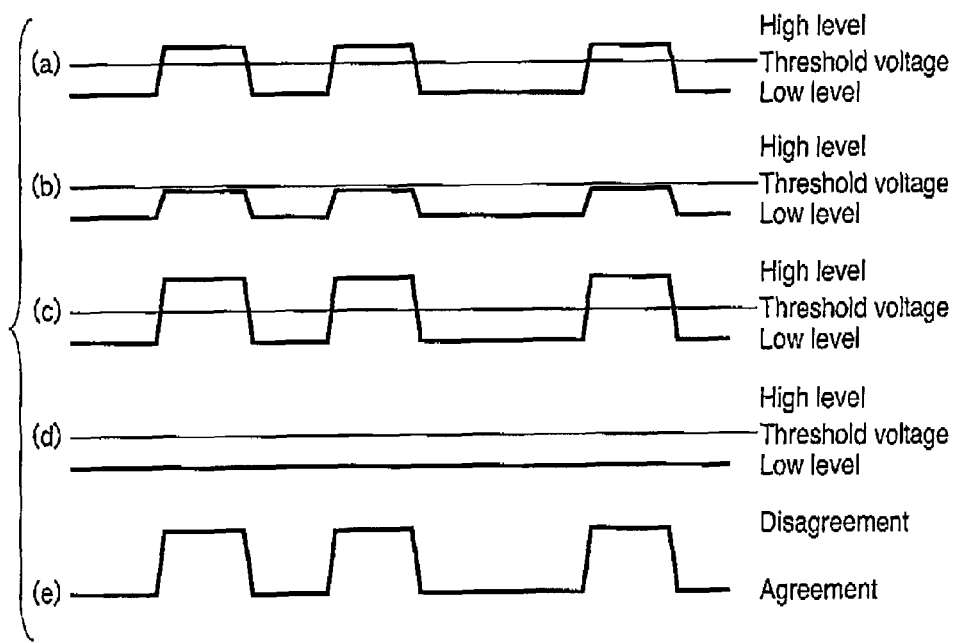
FIG. 3 is another view illustrating signals input to the elements of the malfunction predicting unit shown in FIG. 1.

FIGS. 2 and 3 are views illustrating signals input to the elements of the malfunction predicting unit of the first embodiment. FIG. 2 shows the case where the input digital signals are normal, while FIG. 3 shows the case where the input digital signals have reduced in voltage. Further, in FIGS. 2 and 3, (a) indicates the digital signal supplied to the buffer gate unit 20-1, (b) indicates the level-reduced signal supplied to the buffer gate unit 20-2, (c) indicates the first output signal supplied from the buffer gate unit 20-1 to the comparator 30, (d) indicates the second output signal supplied from the buffer gate unit 20-2 to the comparator 30, and (e) indicates the comparison result supplied from the comparator 30 to the processing unit 40.

In the case of FIG. 2, the first output signal (c) and the second output signal (d) are supplied to the comparator 30, based on the digital signal (a) and the level-reduced signal (b), respectively. Since in this case, the first and second output signals (c) and (d) agree with each other, a low signal indicated by (e) is output as the comparison result to the processing unit 40.

In the case of FIG. 3, the first output signal (c) and the second output signal (d) are supplied to the comparator 30, based on the digital signal (a) and the level-reduced signal (b), respectively. Since in this case, the level-reduced signal (b) does not have a portion that exceeds the threshold voltage, the second output signal always has a "low level." As can be understood from the comparison result (e), where the first output signal (c) agrees with the second output signal (d), the comparator 30 outputs the low signal indicating that they agree with each other, whereas where the first output signal (c) disagrees with the second output signal (d), the comparator 30 outputs the high signal indicating that they disagree with each other.

The processing unit 40 refers to the comparison result from the comparator 30 to monitor the state of the digital signal. Firstly, the processing unit 40 determines whether the comparison result from the comparator 30 is the high signal indicating disagreement. If the processing unit 40 has received the high signal, it determines that the input level of the digital signal has reduced and hence that a malfunction will soon occur in the apparatus. In contrast, if the processing unit 40 has received no high signal, it executes processing described below to determine whether the digital signal is normally supplied, or the digital signal is interrupted.

The processing unit 40 comprises a counter 41 formed of, for example, a shift register. The counter 41 is used to count the number of the received clock signal pulses to thereby measure a period. If the high signal indicating disagreement is not received, the processing unit 40 determines whether the first output signal from the buffer gate unit 20-1 is at the "low level." If the first output signal from the buffer gate unit 20-1 is at the "high level," the processing unit 40 determines that the input digital signal is normal.

In contrast, if the first output signal from the buffer gate unit 20-1 is at the "low level," the processing unit 40 determines whether the period measured by the counter 41 exceeds a preset period. If the measured period does not exceed the preset period, the processing unit 40 determines that the input digital signal is normal. If the measured exceeds the preset period, the processing unit 40 determines that the input digital signal is interrupted.

Figure 4:
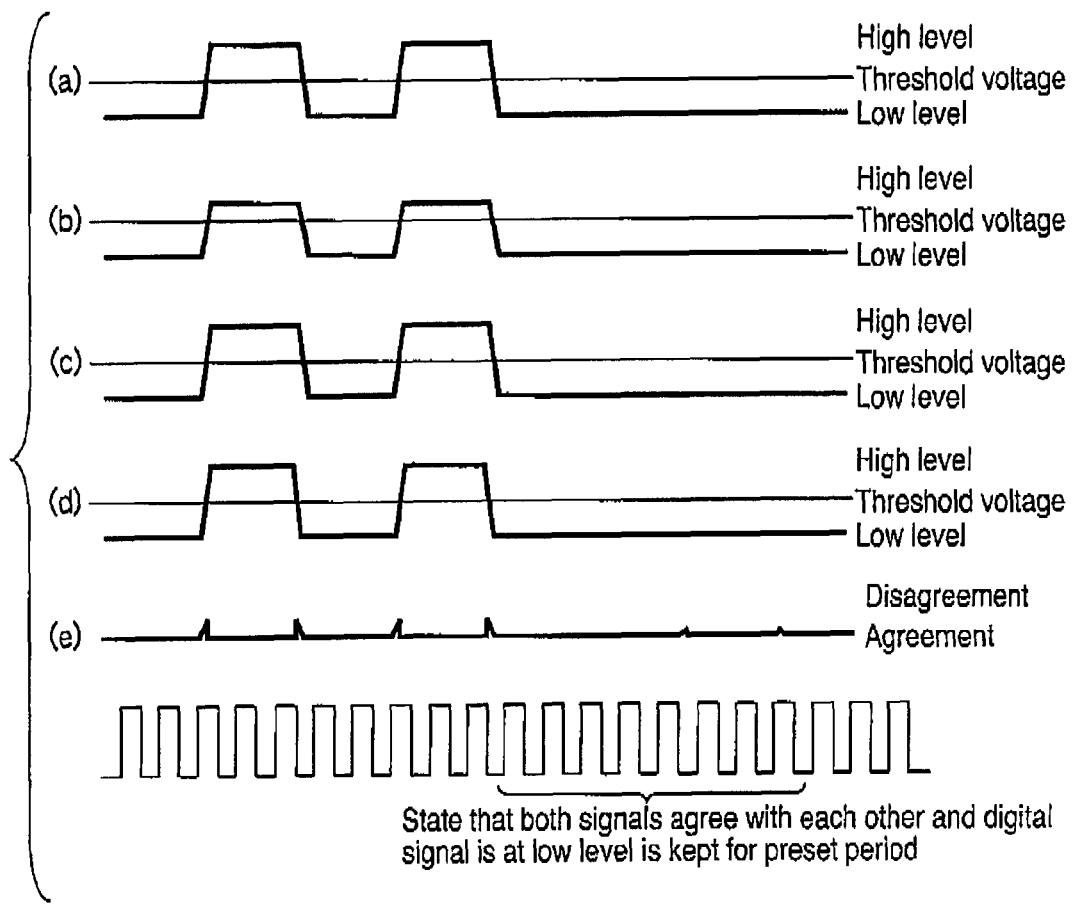
FIG. 4 is a view useful in explaining how the processing unit shown in FIG. 1 detects interruption of the supply of an input signal.

FIG. 4 is a schematic view useful in explaining how the processing unit 40 of the malfunction predicting unit according to the first embodiment detects interruption of the digital signal. If the low signal is received as the comparison result from the comparator 30, the digital signal is at the "low level," and a preset time (e.g., one second) has elapsed, the processing unit 40 determines that the digital signal is interrupted.

As described above, in the first embodiment, when the digital signal is normal, the level reduction unit 10 generates a level reduced signal having a level that just exceeds the threshold voltage of the buffer gate unit 20-2. In this structure, if the level of the digital signal reduces for some reason, the level of the level-reduced signal will become less than the threshold voltage before that of the digital signal becomes less than the threshold voltage. The comparator 30 compares the digital signal with the level-reduced signal to determine whether they agree with each other. If the processing unit 40 receives the high signal indicating disagreement from the comparator 30, it determines that the level of the input digital signal has reduced and hence a malfunction will soon occur in the apparatus.

Since thus, the malfunction predicting unit of the embodiment predicts occurrence of the malfunction of the apparatus not by directly detecting by a digital circuit, but measuring variations in the level of the digital signal. This can omit a detector circuit used in the conventional malfunction predicting units, and hence can realize normal operation even if the input signal has a high frequency higher than 100 MHz.

Further, in the malfunction predicting unit of the first embodiment, the buffer gate unit 20-1 is the same as that used in the conventional input circuits. Thus, the malfunction predicting unit of the first embodiment can have a malfunction predicting function simply by adding, to the conventional input circuits, the resistors 11 and 12, the buffer gate unit 20-2, the comparator 30 and the processing unit 40. This results in the reduction of the required components, circuit scale and cost, and enables accurate malfunction prediction.

Furthermore, in the first embodiment, when the low signal indicating agreement is received, and the first output signal is kept at "low level" for a preset period, it is determined that the digital signal is interrupted. This can eliminate the possibility of occurrence of malfunction when the processing unit 40 determines that the first and second output signals agree with each other.

As described above, the malfunction predicting unit of the first embodiment can accurately predict the occurrence of malfunction even if the signal input thereto has a high frequency and a small amplitude, and can be made small in circuit scale and at low cost. Since thus, the malfunction predicting unit of the first embodiment has a small circuit scale and can be made at low cost, it is advantageous to employ the apparatus in a multi-input and multi-output device such as a Field Programmable Gate Array (FPGA).

Figure 5:
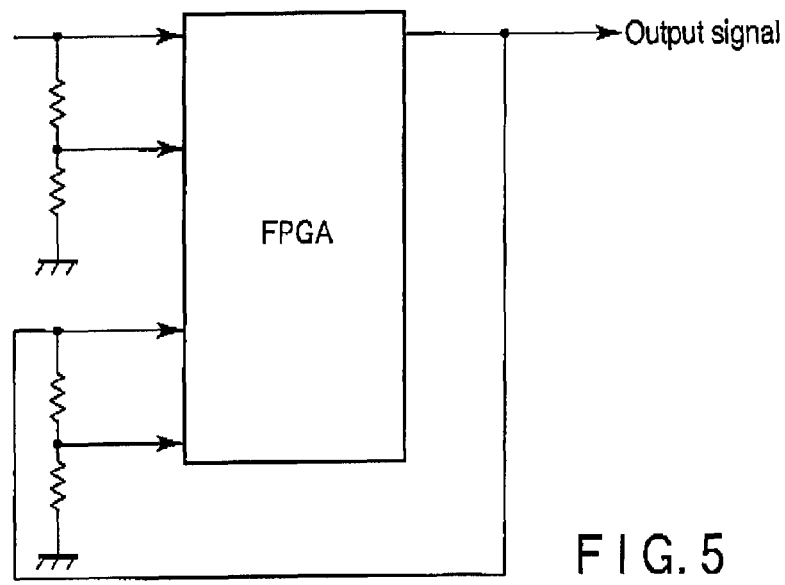
FIG. 5 is view illustrating a state in which the malfunction predicting unit shown in FIG. 1 is mounted on an FPGA.

In the malfunction predicting unit of the first embodiment, the buffer gate units 20-1 and 20-2, the comparator 30 and the processing unit 40 may be formed of an FPGA. In this case, the malfunction predicting unit of the first embodiment can be realized simply by attaching resistors 11 and 12 to the FPGA, as is shown in FIG. 5. Namely, accurate malfunction prediction can be achieved simply by attaching resistors 11 and 12 to the FPGA. Further, if the output signal of the FPGA shown in FIG. 5 is fed back to the malfunction predicting unit, level reduction of the output signal can be detected.

In addition, in the first embodiment, a description has been given of the example where when the processing unit 40 receives the high signal indicating disagreement, it determines that a malfunction will soon occur in the apparatus. However, the first embodiment is not limited to this. For instance, the resistor 11 may have a greater resistance than the above so that the reduced-level signal does not exceed the threshold voltage in the initial state. Namely, in the initial state, the first and second output signals are made to disagree with each other. The processing unit 40 determines whether the low signal indicating agreement is received from the comparator 30. If it is determined that the low signal is received, the processing unit 40 determines whether the first output signal from the buffer gate unit 20-1 is at "low level." If it is determined that the digital signal is at "high level," the processing unit 40 determines that the input level of the digital signal has increased, and hence a malfunction will soon occur in the apparatus. In contrast, if the digital signal is at "low level," the processing unit 40 determines whether a state that the low signal is received and the digital signal is at "low level" is kept for a preset period. If it is determined that the state is kept for the preset period, the processing unit 40 determines that the digital signal is interrupted.

Second Embodiment

FIG. 5 is a block diagram illustrating the configuration of a malfunction predicting unit according to a second embodiment. The malfunction predicting unit of the second embodiment comprises a level reduction unit 50, buffer gate units 20-1 and 20-2, a comparator 30, and a processing unit 40. The second embodiment will be described using, as an example, balanced connection in low voltage differential signaling (LVDS). In FIG. 5, elements similar to those of the first embodiment are denoted by corresponding reference numbers, and no detailed description will be given thereof.

Two balanced signals input to the malfunction predicting unit are each distributed to the buffer gate unit 20-1 and the level reduction unit 50. The level reduction unit 50 comprises resistors 51, 52 and 53. By the resistors 51, 52 and 53, the balanced signals have their level reduced by 20%. The thus level-reduced signals are sent to the other buffer gate unit 20-2.

As described above, even when the malfunction predicting unit employs balanced connection as in the second embodiment, it can provide the same advantages as the first embodiment.

Namely, the malfunction predicting unit of the second embodiment can accurately predict the occurrence of malfunction even if the signal input thereto has a high frequency and a small amplitude, and can be made small in circuit scale and at low cost.

Third Embodiment

FIG. 7 is a block diagram illustrating the configuration of a malfunction predicting unit according to a third embodiment.

The malfunction predicting unit of FIG. 7 comprises a level reduction unit 60, buffer gate units 20-1, 20-2 and 20-3, a comparator 70, and a processing unit 80. In FIG. 7, elements similar to those of the first embodiment are denoted by corresponding reference numbers, and no detailed description will be given thereof.

A digital signal input to the malfunction predicting unit is distributed to the buffer gate unit 20-1 and the level reduction unit 60.

The level reduction unit 60 comprises resistors 61, 62 and 63. By the resistors 61, 62 and 63, the level reduction unit 60 divides the digital signal into a ground level signal and first and second reduced-level signals. As a result, the level reduction unit 60 reduces the level of the digital signal by, for example, 20%, and sends the resultant signal as a first level-reduced signal to the buffer gate unit 20-2. Similarly, the level reduction unit 60 reduces the level of the digital signal by, for example, 40%, and sends the resultant signal as a second level-reduced signal to the buffer gate unit 20-3. The level of the second level-reduced signal is preset so that it is less than a threshold voltage preset in the buffer gate units 20-1 to 20-3, when the input digital signal is normal.

The buffer gate unit 20-1 receives the digital signal, adjusts the voltage of the received digital signal based on the preset threshold voltage, and outputs a first output signal to the comparator 70, the processing unit 80, and post-stage elements (not shown).

The buffer gate units 20-2 and 20-3 receive the first and second level-reduced signals, and adjust the voltages of the received first and second level-reduced signals based on the preset threshold voltage, respectively. The buffer gate units 20-2 and 20-3 output second and third output signals to the comparator 70, respectively.

The comparator 70 compares the first output signal from the buffer gate unit 20-1 with the second output signal from the buffer gate unit 20-2 by logical comparison (exclusive OR), and outputs the comparison result (first comparison result) to the processing unit 80. More specifically, if the first and second output signals agree with each other, the comparator 70 outputs a first low signal of a "low level" voltage as the first comparison result. Further, if the first and second output signals disagree with each other, the comparator 70 outputs a first high signal of a "high level" voltage as the first comparison result.

The comparator 70 also compares the first output signal from the buffer gate unit 20-1 with the third output signal from the buffer gate unit 20-3 by logical comparison (exclusive OR), and outputs the comparison result (second comparison result) to the processing unit 80. More specifically, if the first and third output signals agree with each other, the comparator 70 outputs a second low signal of a "low level" voltage as the second comparison result. Further, if the first and third output signals disagree with each other, the comparator 70 outputs a second high signal of a "high level" voltage as the second comparison result.

Figure 9:
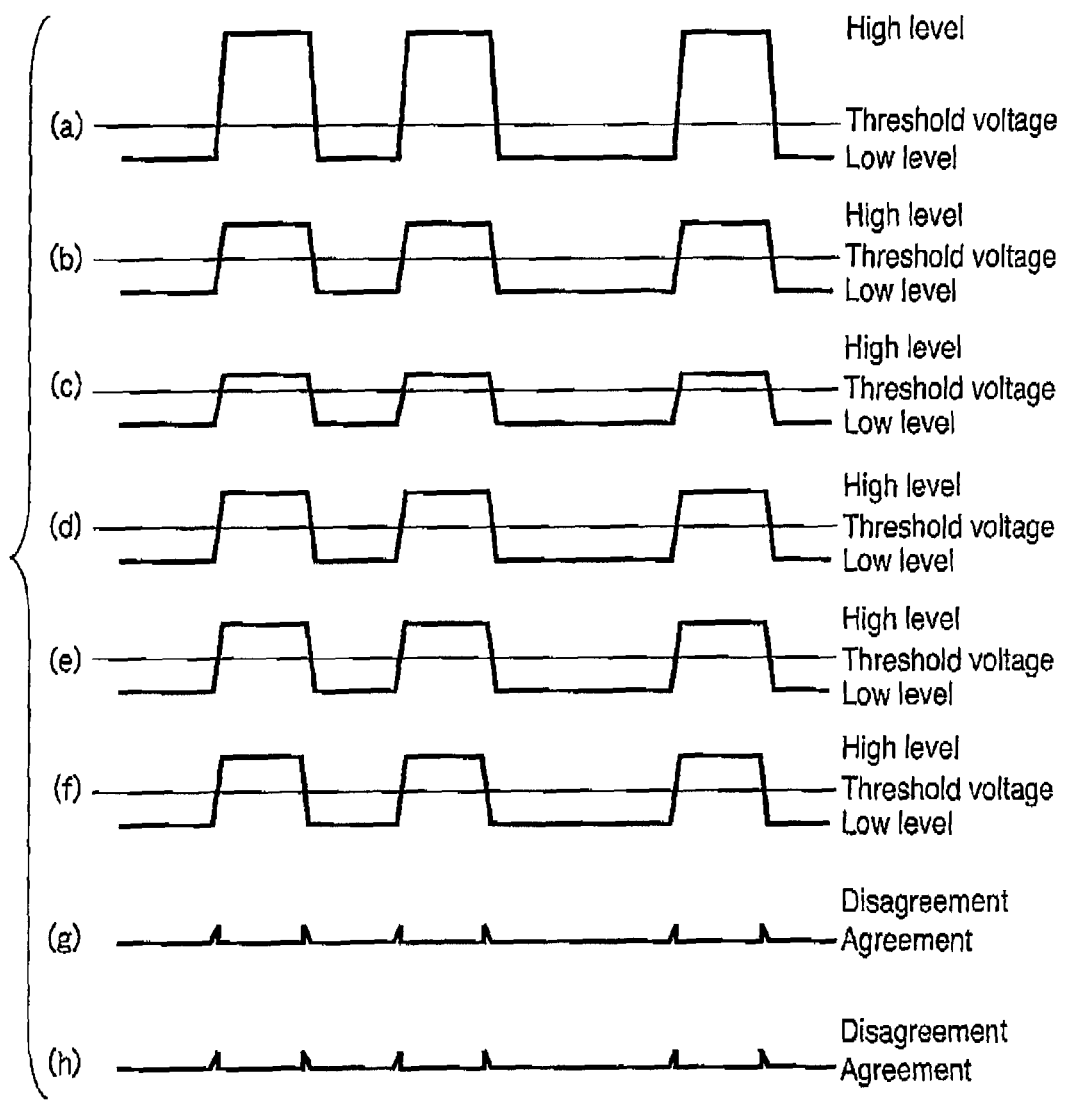
FIG. 9 is another view illustrating signals input to the elements of the malfunction predicting unit shown in FIG. 7.

FIGS. 8 and 9 are views illustrating signals input to the elements of the malfunction predicting unit of the third embodiment. FIG. 8 shows the case where the input digital signals are normal, while FIG. 9 shows the case where the input digital signals have increased in voltage. Further, in FIGS. 8 and 9, (a) indicates the digital signal supplied to the buffer gate unit 20-1, (b) indicates the first level-reduced signal supplied to the buffer gate unit 20-2, (c) indicates the second level-reduced signal supplied to the buffer gate unit 20-3, (d) indicates the first output signal supplied from the buffer gate unit 20-1 to the comparator 70, (e) indicates the second output signal supplied from the buffer gate unit 20-2 to the comparator 70, (f) indicates the third output signal supplied from the buffer gate unit 20-3 to the comparator 70, (g) indicates the first comparison result supplied from the comparator 70 to the processing unit 80, and (h) indicates the second comparison result supplied from the comparator 70 to the processing unit 80.

The processing unit 80 refers to the first and second comparison results from the comparator 70 to monitor the state of the digital signal.

Firstly, the processing unit 80 determines whether the first comparison result from the comparator 70 is the first high signal indicating that the first and second output signals disagree with each other. If the first comparison result is the first high signal, the processing unit 80 determines that the input level of the digital signal has reduced and hence that a malfunction will soon occur in the apparatus. In contrast, if the first comparison result is not the first high signal, the processing unit 80 executes processing described below to determine whether the digital signal is normally supplied, or the digital signal is interrupted.

The processing unit 80 comprises a counter 81 formed of, for example, a shift register. The counter 81 is used to count the number of the received clock signal pulses to thereby measure a period. If the first high signal indicating disagreement is not received, the processing unit 80 determines whether the first output signal from the buffer gate unit 20-1 is at the "low level." If the first output signal from the buffer gate unit 20-1 is at the "high level," the processing unit 80 determines that the input digital signal is normal.

In contrast, if the first output signal from the buffer gate unit 20-1 is at the "low level," the processing unit 80 determines whether the period measured by the counter 81 exceeds a preset period. If the measured period does not exceed the preset period, the processing unit 80 determines that the input digital signal is normal. If the measured exceeds the preset period, the processing unit 80 determines that the input digital signal is interrupted.

Furthermore, the processing unit 80 determines whether the second comparison result from the comparator 70 is the second low signal indicating that the first and second output signals agree with each other. If it is determined that the second comparison result is the second high signal indicating that the first and third output signals disagree with each other, the processing unit 80 determines that the digital signal is normal. In contrast, if it is determined that the second comparison result is the second low signal, the processing unit 80 determines whether the first output signal from the buffer gate unit 20-1 is at the "low level." If the first output signal from the buffer gate unit 20-1 is at the "high level," the processing unit 80 determines that the level of the input digital signal has increased, and hence that a malfunction will soon occur in the apparatus. In contrast, if the first output signal is at the "low level," the processing unit 80 determines whether a state that the second comparison result is the second low signal and the first output signal is at "low level" is kept for the preset period. If the state is kept for the preset period, the processing unit 80 determines that the digital signal is interrupted.

As described above, in the third embodiment, when the digital signal is normal, the level reduction unit 60 generates a second level-reduced signal having a level that is less than the threshold voltage of the buffer gate unit 20-3. In this structure, if the level of the digital signal increases for some reason, the level of the second level-reduced signal will exceed the threshold voltage. The comparator 70 compares the digital signal with the second level-reduced signal to determine whether they agree with each other. If the second low signal indicating agreement is received from the comparator 70 and the first output signal from the buffer gate unit 20-1 is at the "high level," the processing unit 80 determines that the level of the input digital signal has increased and hence a malfunction will soon occur in the apparatus. By virtue of this structure, the malfunction predicting unit of the third embodiment can predict occurrence of a malfunction in the apparatus, based on whether the level of the digital signal has increased, as well as based on whether it has reduced.

Other Embodiments

Although in the above-described embodiments, the first to third output signals are compared by exclusive OR operation, the above-described embodiments are not limited to the exclusive OR operation.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A malfunction predicting unit comprising:
   a level reduction unit configured to reduce an input digital signal by a preset level to generate a level-reduced signal;
   a first buffer gate unit configured to generate a first output signal, the first output signal having a first level if the digital signal is higher than a preset threshold level, and a second level if the digital signal is not higher than the preset threshold level;
   a second buffer gate unit configured to generate a second output signal, the second output signal having the first level if the level-reduced signal is higher than the preset threshold level, and the second level if the level-reduced signal is not higher than the preset threshold level;
   a comparator unit configured to compare the first and second output signals to generate a comparison result indicating whether the first and second output signals agree with each other; and
   a processing unit configured to determine whether a malfunction will soon occur, based on the comparison result.

2. The unit of claim 1, wherein
   in a normal state, the level reduction unit reduces a level of the digital signal to set the level-reduced signal to a level higher than the preset threshold level; and
   if the first and second output signals disagree with each other, the processing unit determines that the level of the digital signal has reduced and the malfunction will soon occur.

3. The unit of claim 2, wherein the processing unit receives a clock signal, measures a period preset based on the clock signal, and determines that the digital signal is interrupted if a state that the first and second output signals agree with each other and the digital signal is at a lower one of two preset levels is kept for the preset period.

4. The unit of claim 1, wherein
   in a normal state, the level reduction unit reduces a level of the digital signal to set the level-reduced signal to a level lower than the preset threshold level; and if the first and second output signals agree with each other, the processing unit determines that the level of the digital signal has increased and the malfunction will soon occur.

5. The unit of claim 4, wherein the processing unit receives a clock signal, measures a period preset based on the clock signal, and determines that the digital signal is interrupted if a state that the first and second output signals agree with each other and the digital signal is at a lower one of two preset levels is kept for the preset period.

6. A malfunction predicting unit comprising:
a level reduction unit configured to reduce an input digital signal by a preset level to generate a first level-reduced signal, and also configured to reduce the digital signal in a normal state to a level lower than a preset threshold level to generate a second level-reduced signal;
a first buffer gate unit configured to generate a first output signal, the first output signal having a first level if the digital signal is higher than the preset threshold level, and a second level if the digital signal is not higher than the preset threshold level;
a second buffer gate unit configured to generate a second output signal, the second output signal having the first level if the first level-reduced signal is higher than the preset threshold level, and the second level if the first level-reduced signal is not higher than the preset threshold level;
a third buffer gate unit configured to generate a third output signal, the second output signal having the first level if the second level-reduced signal is higher than the preset threshold level, and the second level if the second level-reduced signal is not higher than the preset threshold level;
a comparator unit configured to compare the first and second output signals to generate a first comparison result indicating whether the first and second output signals agree or disagree with each other, also configured to compare the first and third output signals to generate a second comparison result indicating whether the first and third output signals agree or disagree with each other; and
a processing unit configured to determine that a level of the digital signal has reduced and a malfunction will soon occur, if the first comparison result indicates that the first and second output signals disagree with each other, and also configured to determine that the level of the digital signal has increased and a malfunction will soon occur, if the second comparison result indicates that the first and third output signals agree with each other.

7. The unit of claim 6, wherein the processing unit performs:
receiving a clock signal;
measuring a period preset based on the clock signal;
determining that the digital signal is interrupted if a state that the first and second output signals agree with each other and the digital signal is at a lower one of two preset levels is kept for the preset period; and
determining that the digital signal is interrupted if a state that the first and third output signals agree with each other and the digital signal is at the lower level is kept for the preset period.

* * * * *